United States Patent [19]

Sinke et al.

[11] 4,048,288

[45] Sept. 13, 1977

[54] METHOD FOR PREVENTING EVAPORATION-CONDENSATION CAKING OF SODIUM CHLORIDE AT HIGH TEMPERATURES

[75] Inventors: Gerard C. Sinke; Martin A. Langhorst; James A. May, Sr., all of Midland, Mich.

[73] Assignee: The Dow Chemical Company, Midland, Mich.

[21] Appl. No.: 558,403

[22] Filed: Mar. 14, 1975

[51] Int. Cl.$^2$ .......................... C01D 3/26; C01D 3/04; C01D 3/22

[52] U.S. Cl. ..................................... 423/267; 423/499

[58] Field of Search ................................ 423/267, 499

[56] References Cited

U.S. PATENT DOCUMENTS

| | | | |
|---|---|---|---|
| 352,465 | 11/1886 | Hughes | 423/267 X |
| 1,140,995 | 5/1915 | Miller | 423/267 X |
| 1,869,518 | 8/1932 | Smith | 423/267 |
| 2,768,898 | 10/1956 | Waldo | 423/267 X |

FOREIGN PATENT DOCUMENTS 25,082 of 1910 United Kingdom ................ 423/267

OTHER PUBLICATIONS

C & EN, Jan. 1, 1962, p. 88.
Industrial and Engineering Chemistry, Feb. 1933, pp. 142–146.

Primary Examiner—Edward Stern
Attorney, Agent, or Firm—G. H. Korfhage; J. M. Kuszaj

[57] ABSTRACT

By providing about 1 percent of an extremely finely divided powder, e.g. less than about 60 microns, disposed throughout a body of sodium chloride particles, the salt particles can be heated without caking to temperatures higher than otherwise obtainable without experiencing caking. Suitable powders include those binary oxides, carbonates, sulfates, phosphates and hydroxides of Group II and Group IV elements, which are solids within the temperature range to be encountered.

13 Claims, No Drawings

METHOD FOR PREVENTING EVAPORATION-CONDENSATION CAKING OF SODIUM CHLORIDE AT HIGH TEMPERATURES

BACKGROUND OF THE INVENTION

A. Field of the Invention

This invention relates to a method employing an additive for preventing caking of a body of granular sodium chloride at temperatures between about 400° C and the melting point of sodium chloride.

B. Description of the Prior Art

It is known in the art to dispose of organic waste contained in aqueous effluent streams also containing inorganic solids, by incineration in or over a bed of fluidized granular material, i.e., wherein the granular material is maintained in a state of turbulent suspension in a hot, upflowing gas. See, for example, Copeland et al, U.S. Pat. No. 3,309,262; Albertson et al., U.S. Pat. No. 3,319,586; and Mallat et al., "Incinerate Sludge and Caustic," *Hydrocarbon Processing*, pp. 121-122, May, 1970. In such processes, the waste stream to be disposed of is customarily sprayed into the fluidized bed itself or into the so-called freeboard zone above the bed. Upon contact with the bed, the organics are oxidized and are vented to the atmosphere, and the solid inorganics become part of the bed itself. The accumulated inorganics can be recovered from the reactor and profitably recycled by withdrawing portions of the bed during the incineration process.

It is a frequent practice to employ an inert material, such as sand, during start-up of such incineration processes. As the process is carried out and portions of the bed removed as the inorganics accumulate, it is apparent that the sand will be gradually replaced by the inorganic components of the waste stream. Until such time as the replacement is substantially complete, however, the portions of the bed extracted will contain a substantial amount of the start-up bed material, and may be unsuitable for further use without additional treatment. In order to avoid any waste of the inorganics recovered from the waste stream shortly after startup, therefore, it would be most advantageous to be able to employ as a bed material during start-up, a material having a composition similar to the inorganics contained in the waste stream.

In attempting to bring a bed consisting substantially of sodium chloride up to temperatures on the order of about 650° C, caking, i.e., agglomeration of the salt particles, was encountered. Depending on various factors such as particles size and shape, velocity of the fluidizing gas, and the like, the evidence of caking was first encountered at various temperatures ranging from about 400° C to somewhat less than about 600° C.

It is known in the art to employ various freeflowing agents for salt. See, for example, Kaufman, *Sodium Chloride—The Production and Properties of Salt and Brine*, pp. 275-276, Reinhold Publishing Corp., New York, 1960. The prior art, however, has taught use of such free-flowing agents only to inhibit caking at more or less ambient temperatures, e.g., from about −35° to about 55° C. Caking at such temperatures is well known to be caused principally by water vapor.

SUMMARY OF THE INVENTION

In accordance with the present invention, it has been found that by dispersing throughout a body of particulate sodium chloride a small quantity of a solid additive, sodium chloride can be maintained without caking at temperatures within the range of from about 400° C up to the melting point of sodium chloride, or up to temperatures of at least about 600° C but less than the melting point of sodium chloride where melting occurs prematurely due to impurities present in the bed of sodium chloride. The additive is selected from those binary oxides, carbonates, sulfates, phosphates, and hydroxides of Group II and Group IV elements which are solids at the maximum temperature to be encountered in the body of particles. Mixtures of such compounds may also be employed. It is critical that the additive be substantially comprised of particles no larger than about 60 microns, i.e., such that at least about 75 percent (all percentages herein are by weight) of the additive passes through a No. 230 sieve (U.S. Sieve Series used throughout). Illustrative of the practical applications of the present invention is that it permits use of granular sodium chloride during the start-up of a fluidized bed incineration process for a waste stream containing organics and sodium chloride.

FURTHER DESCRIPTION OF THE INVENTION

Although much of the discussion which follows is in terms of fluidized bed of sodium chloride particles, the particular context is merely illustrative of a wide variety of applications for the invention. The underlying principles of the invention are such that those skilled in the art will have no difficulty in employing the inventive concept in processes other than incineration, such as calcining, or in apparatus other than a fluidized bed reactor, such as a rotary kiln, based on the teachings herein. Accordingly, the claims should not be construed as limited only to fluidized bed operations.

For several reasons, the caking problem solved by the present invention, i.e. that first occurring between about 400° and about 600° C, is believed attributable to an evaporation-condensation sintering mechanism wherein sodium chloride vaporizes from the surface of two adjacent particles and immediately recodenses in the neck area between the particles. Such a mechanism is described in further detail by Kingery in *Introduction to Ceramics*, pp. 371ff., John Wiley & Sons, Inc., New York, 1960.

Laboratory studies were carried out using three different types of salts. One was so-called "calcium magnesium free" (hereinafter "CMF") sodium chloride having as the only significant impurity, a few hundreths of a percent sodium sulfate. Particle size measurements for the CMF salt showed 100 percent passed a No. 18 sieve and 20 percent retained on a No. 35 sieve. The second type of salt was reagent grade salt, assay 99.5 percent NaCl containing less than 0.01% other inorganic salts. Particle size of the reagent grade salt was 98 percent through a No. 35 sieve. The third salt source was sodium chloride obtained from the bed of a fluidized bed incinerator, obtained by spraying waste brine on a bed of fluidized sand. The composition of the incinerator bed salt varied, but averaged, by weight several percent $SiO_2$, 0.5 percent $Na_2SO_4$, 1 percent $Na_2CO_3$, and the balance NaCl. Particle size was No. 18 sieve >85% >No. 35 sieve.

Each of the first two salts, when fluidized in 99.998 percent pure nitrogen, caked after several hours at 400° C. Microscopic examination showed agglomerates in which the faces of the individual salt cubes had sintered together. The incinerator bed salt showed less tendency to cake, which is to be expected since the larger and more rounded bed salt particles are less favorable for sintering than are the more uniformly cubic crystals of the more pure salts. Nevertheless, the bed salts began to stick to the walls of the fluidizing apparatus at about 500° C. At 600° C, the incinerator bed salt caked within 30 minutes. Scanning electron microscopy did not show a concentration of sulfur at the junctions between the particles as would be expected if sodium sulfate had a role in the caking. Moreover, each of the reagent and CMF grade salts was heated to well above 400° C, allowed to cool to 400° C, and then broken up with a stirring rod. Each caked a second time, suggesting water does not play a role in the caking mechanism.

It has been found that the caking believed caused by the foregoing mechanism can be prevented to temperatures approaching the melting point of sodium chloride (about 800° C) by providing with the salt a small amount of a finely divided additive. It should be pointed out that where the sodium chloride contains even small quantities of certain impurities, particularly sodium sulfate and/or sodium carbonate, caking may occur at temperatures in excess of 600° C notwithstanding use of the additive described herein. Such caking, however, is believed caused by a different mechanism.

The additive employed herein is selected from those binary oxides, carbonates, sulfates, phosphates, and hydroxides of Group II and Group IV elements which are solids at the temperatures to be encountered. It is understood that certain of the compounds included in the generic definition may be converted to certain other included compounds at high temperatures. For example, calcium hydroxide is converted to calcium oxide at about 600° C. Similarly, magnesium carbonate is converted to magnesium oxide at about 400° C. Preferred additives are calcium and magnesium oxide, silicon and titanium dioxide, and calcium hydroxide. Most preferred is magnesium oxide.

As hereinbefore stated, the particle size of the additive is critical. To be effective, the particles should have a major dimension no larger than about 60 microns, and preferably no larger than about 45 microns. Thus, at least about 75 percent of the additive should have a particle size sufficiently small to pass through a No. 230 sieve, and preferably, substantially all of the additive is sufficiently small to pass a No. 325 sieve.

The amount of additive employed is from about 0.5 to about 2 percent of the weight of the sodium chloride. Smaller amounts are not sufficiently effective. Larger quantities are not per se detrimental, but are not needed and only result in waste, unnecessary contamination of the bed with additive, and/or venting of the excess additive in the exhaust gases.

The method by which the additive is dispersed throughout the sodium chloride is not critical. For example, depending on the source of the sodium chloride, the sodium chloride may contain dispersed therethroughout as an impurity small amounts of the additive of the requisite particle size, such as is further described in Example 7. Or, the additive may be placed in the incinerator, kiln, or the like, as a solid along with the sodium chloride. The additive and the salt may then be admixed prior to start-up, or at least before the temperature of the sodium chloride has been raised to temperatures above about 375° C, e.g. by fluidizing gas. Other variations are readily apparent to those skilled in the art. To assure minimum loss of the additive by stack blow-out, however, a preferred embodiment where the additive must be dispersed throughout a body of sodium chloride not already containing the additive as an impurity, is to heat the sodium chloride to temperatures of about 300° C and then add the additive as an aqueous slurry, preferably by spraying the slurry onto the sodium chloride.

EXAMPLES

The following examples are included to further illustrate the practice of the invention. The advantages provided by the herein described invention over the prior art are illustrated by comparing the Examples with the Comparison Runs and with the result of the laboratory studies hereinbefore described in the third and fourth paragraphs under caption III.

EXAMPLES 1-5

A laboratory scale fluidized bed apparatus was provided wherein the fluidizing gas, 99.998% pure nitrogen, was heated by a tube furnace and passed through a horizontal sintered quartz disc sealed into a vertical quartz tube. The nitrogen was passed through the tube at a rate on the order of about 1 foot per second. In the apparatus, successive beds of reagent grade salt, hereinbefore described, were fluidized. Based on the weight of the sodium chloride, 1 percent of each of the following compounds was employed separately as an additive, with the result described. Substantially all of each additive passed through a No. 325 sieve, except for the silicon dioxide of which 80% passed through such a sieve. In each instance, the additive was dispersed throughout the sodium chloride, and the resulting mixture was charged to the test apparatus prior to commencement of the flow of the fluidizing gas.

| Example | Additive | Effect of the Additive |
|---------|----------|------------------------|
| 1 | MgO | No caking in 72 hrs at various temperatures from 400° C to 700° C. |
| 2 | SiO$_2$ | No caking after 3 hrs. at 600° C. |
| 3 | TiO$_2$ | No caking after an hour at 650° C. |
| 4 | Ca(OH)$_2$* | No caking after 2 hrs. at 600°-650° C. |
| 5 | CaCO$_3$ | Caking did not occur until after several hours at about 600° C. |

*Converted to CaO at 600° C.

Without any of the foregoing additives, caking occurred in a comparable bed of reagent grade salt after several hours at about 400° C and within a fraction of an hour at higher temperatures.

Comparison 1

Showing Composition of the Additive is Critical

Following substantially the same procedure as in Example 1, a Group III binary oxide, Al$_2$O$_3$, which passed through a No. 325 sieve was employed as an additive. The bed caked completely within 30 minutes at about 600° C.

COMPARISON 2

Showing Particle Size of the Additive is Critical

Following substantially the same procedure as in Example 1, magnesium oxide which passed through a No. 65 sieve but was retained on a No. 200 sieve, and silicon dioxide which passed through a No. 100 sieve and was retained on a No. 200 sieve were separately employed as additives. In each instance, the bed caked completely within 30 minutes at about 600° C.

COMPARISON 3

-Showing Caking Of Incinerator Bed Salt Without Additive

In the same manner as in Example 1, incinerator bed salt hereinabove described, containing substantially no additive of sufficiently small particle size, was maintained at 500° C. Some salt adhered to the walls of the apparatus, but no appreciable caking occurred. As the temperature was increased to about 600° C, the bed caked within 30 minutes.

EXAMPLE 6

To the caked incinerator bed salt described in Comparison Run 3 was added 1 percent magnesium oxide which passed through a No. 325 sieve. The caking was eliminated with agitation and no further agglomeration was observed.

EXAMPLE 7

Over a bed of fluidized sand in a fluidized bed incinerator was continuously sprayed a waste brine stream containing as the principal inorganic component, sodium chloride and in addition a few percent calcium chloride and sodium hydroxide. The bed was fluidized with gases containing sulfur dioxide, oxygen, water, and carbon dioxide, so that calcium sulfate and calcium carbonate were formed in the bed and dispersed therethroughout upon reaction of the sulfur dioxide, water, oxygen, sodium hydroxide, carbon dioxide, and calcium chloride. After operation for a sufficient time so that substantially all of the sand had been removed from the bed, the incinerator was shut down. The bed, containing at least 80 percent sodium chloride and a total of a few percent dispersed calcium sulfate and calcium carbonate, was allowed to cool to ambient temperatures. The bed was refluidized and maintained for several hours at about 600° C without caking. No salt was observed adhering to the walls, as did occur in Comparison 3.

What is claimed is:

1. A method for preventing caking in a body of granules of sodium chloride at temperatures within the range of from about 400° C up to the melting point of sodium chloride, or up to temperatures of at least about 600° C but less than the melting point of sodium chloride where melting occurs at such temperatures due to impurities in the sodium chloride, comprising:
    1. dispersing throughout the sodium chloride an effective amount of a solid additive selected from the group consisting of binary oxides, carbonates, sulfates, phosphates, and hydroxides of Group II and Group IV elements, or mixtures thereof, wherein at least about 75% of the additive has a particle size sufficiently small to pass through a No. 230 sieve; and
    2. following said dispersing step, maintaining the sodium chloride as granules substantially free from caking at a temperature within the above recited temperature range for a period of time greater than that for which a substantially identical body of sodium chloride having no such additive could be maintained without caking under substantially identical conditions, said maintaining step including heating said sodium chloride to said temperature if said sodium chloride is at a lesser temperature at the time said dispersing step is carried out.

2. The method of claim 1 wherein the additive is magnesium oxide, silicon dioxide, titanium dioxide, calcium hydroxide, or calcium oxide.

3. The method of claim 2 wherein substantially all of the additive is of a sufficiently small size to pass through a No. 325 sieve.

4. The method of claim 2 wherein the additive is magnesium oxide.

7. The method of claim 1 wherein substantially all of the magnesium oxide is of a sufficiently small size to pass through a No. 325 sieve.

6. The method of claim 5 wherein based on the weight of the sodium chloride, from about 0.5 to about 2 percent of the magnesium oxide is employed.

7. The method of claim 1 wherein substantially allof the additive is of a sufficiently small size to pass through a No. 325 sieve.

8. The method of claim 7 wherein based on the weight of the sodium chloride, from about 0.5 to about 2 percent of the additive is employed.

9. The method of claim 1 wherein based on the weight of the sodium chloride, from about 0.5 to about 2 percent of the additive is employed.

10. The method of claim 9 wherein the additive is selected from the group consisting of magnesium oxide, silicon dioxide, titanium dioxide, calcium hydroxide, and calcium oxide.

11. The method of claim 1 wherein the sodium chloride source employed contains the additive dispersed therethroughout as an impurity.

12. The method of claim 1 wherein the additive is added to the sodium chloride at ambient temperatures and dispersed therethroughout at a temperature less than about 375° C.

13. The method of claim 1 wherein the sodium chloride is heated to about 300° C and the additive is thereafter added to the sodium chloride as an aqueous slurry.

* * * * *

UNITED STATES PATENT AND TRADEMARK OFFICE
CERTIFICATE OF CORRECTION

PATENT NO. : 4,048,288
DATED : September 13, 1977
INVENTOR(S) : Gerard C. Sinke et al.

Page 1 of 2 page

It is certified that error appears in the above-identified patent and that said Letters Patent are hereby corrected as shown below:

Column 1, line 51, delete "particles" and insert --particle--.

Column 1, line 55, delete "freeflowing" and insert --free-flowing--.

Column 2, line 25, insert --a-- in front of the word fluidized.

Column 2, line 40, delete "recodenses" and insert --recondenses--.

Column 2, line 48, delete "hundreths" and insert --hundredths--.

Column 4, line 65, delete "ox ide" and insert --oxide--.

Column 6, line 25, Claim 5, delete the number of the Claim "7" and insert --5--.

UNITED STATES PATENT AND TRADEMARK OFFICE
CERTIFICATE OF CORRECTION

PATENT NO. : 4,048,288  Page 2 of 2 pages
DATED : September 13, 1977
INVENTOR(S) : Gerard C. Sinke; Martin A. Langhorst; James A. May It is certified that error appears in the above-identified patent and that said Letters Patent are hereby corrected as shown below:

Column 6, line 25, Claim 5, after the method of claim delete "1" and insert --4--.

Column 6, line 31, Claim 7, delete "allof" and insert --all of--.

Signed and Sealed this

Seventeenth Day of January 1978

[SEAL]

Attest:

RUTH C. MASON
Attesting Officer

LUTRELLE F. PARKER
Acting Commissioner of Patents and Trademarks